United States Patent [19]

Curchod

[11] 4,449,407
[45] May 22, 1984

[54] DRIVE SHAFT MOUNTING ASSEMBLY FOR DYNAMIC WHEEL BALANCING MACHINE

[76] Inventor: Donald B. Curchod, c/o Dynabal Corporation, 151 Laura La., Palo Alto, Calif. 94303

[21] Appl. No.: 417,849

[22] Filed: Sep. 14, 1982

[51] Int. Cl.³ .............................................. G01M 1/22
[52] U.S. Cl. ...................................... 73/462; 73/471; 73/475
[58] Field of Search ............................... 73/462–466, 73/471, 473, 475–477, 459

[56] References Cited

U.S. PATENT DOCUMENTS

| | | | |
|---|---|---|---|
| 1,599,922 | 9/1926 | Rathbone | 73/473 |
| 2,322,939 | 6/1943 | Inman | 73/459 |
| 2,382,665 | 8/1945 | Riopelle et al. | 73/473 |
| 2,461,645 | 2/1949 | Kallmann | 73/465 |
| 4,046,017 | 9/1977 | Hill | 73/462 |
| 4,336,715 | 6/1982 | Arnold et al. | 73/462 |
| 4,341,119 | 7/1982 | Jackson et al. | 73/462 |

*Primary Examiner*—James J. Gill
*Attorney, Agent, or Firm*—Flehr, Hohbach, Test, Albritton & Herbert

[57] ABSTRACT

A drive shaft mounting assembly for dynamic wheel balancing machines includes force sensors supporting bearings at axially spaced positions of the shaft. The assembly further includes rods extending between the bearings in a manner absorbing the forces of run-out created at each bearing.

11 Claims, 14 Drawing Figures

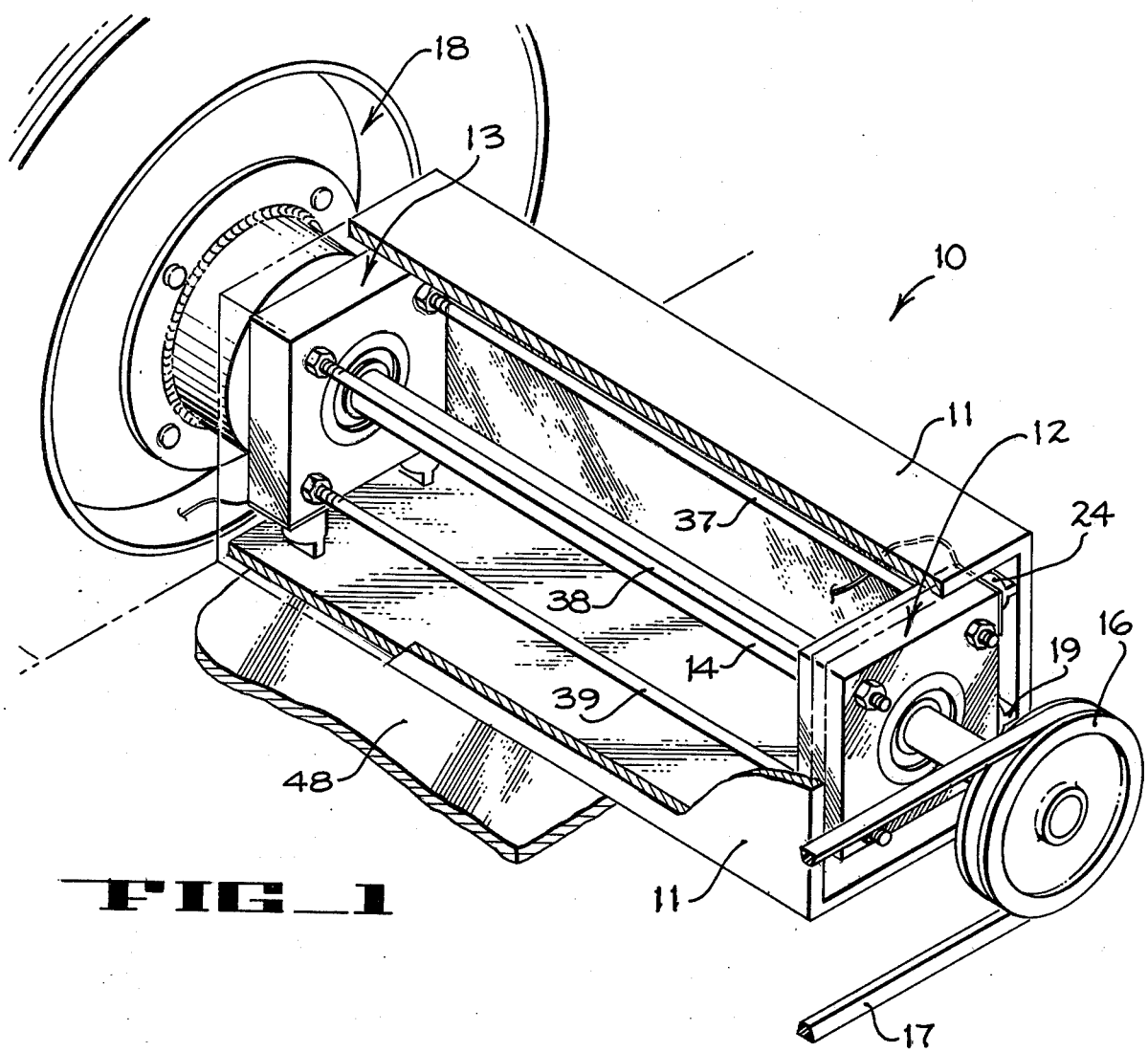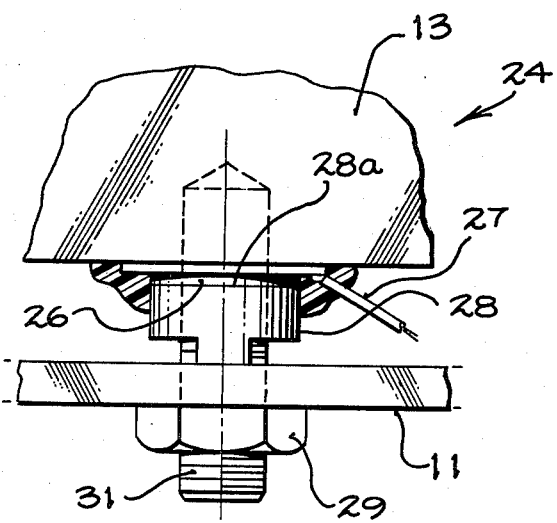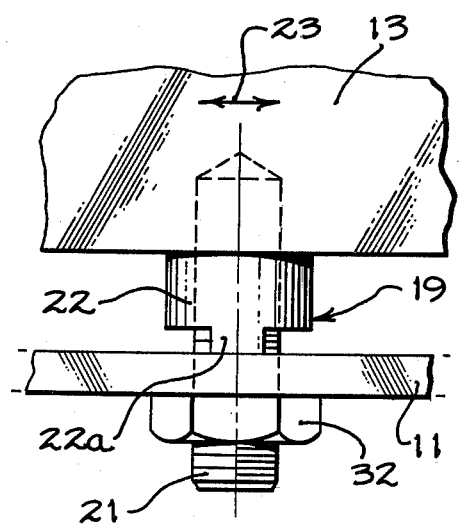

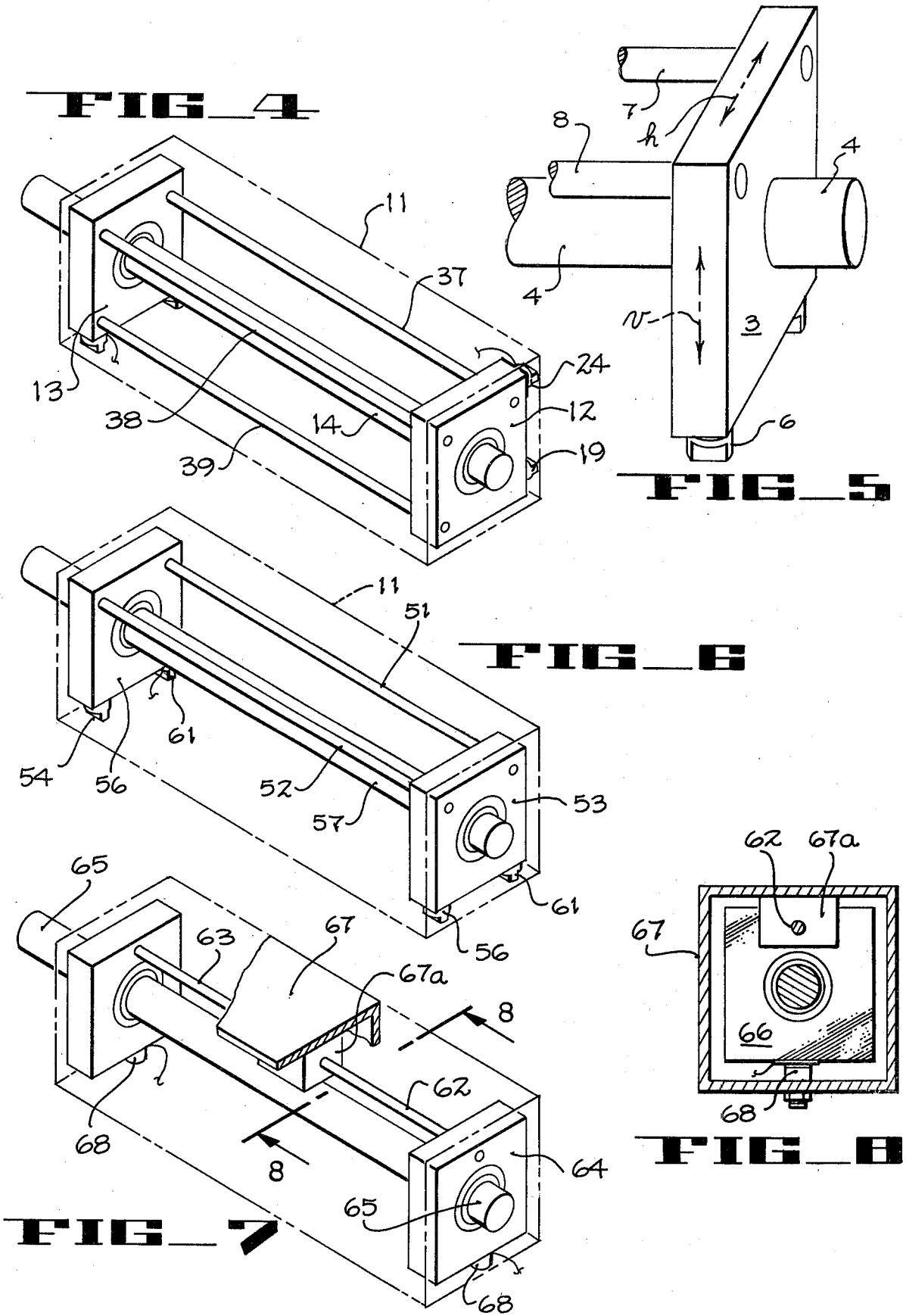

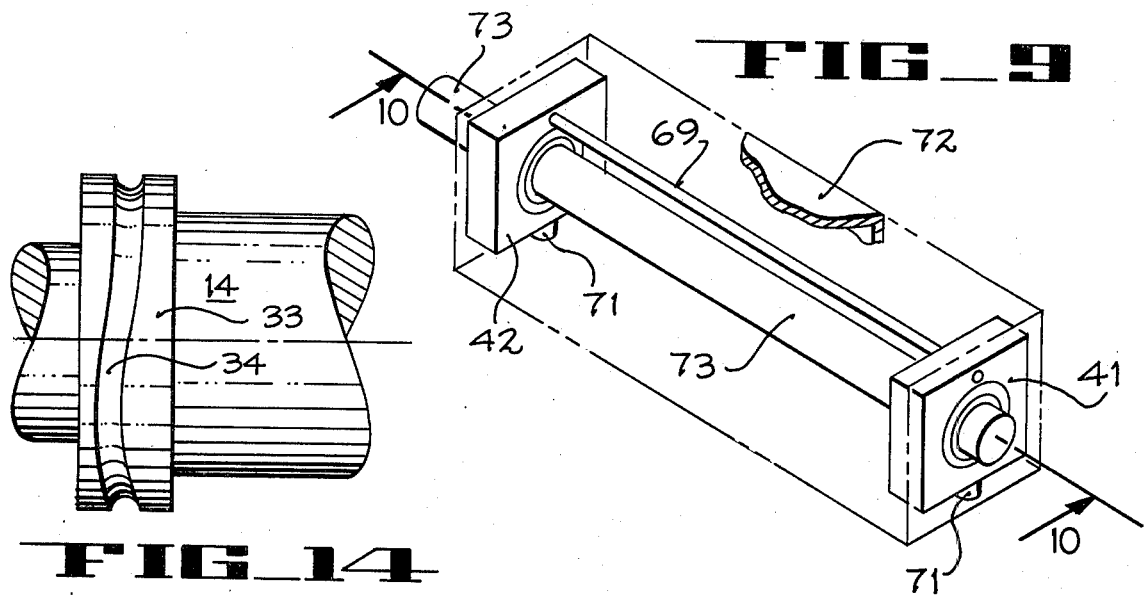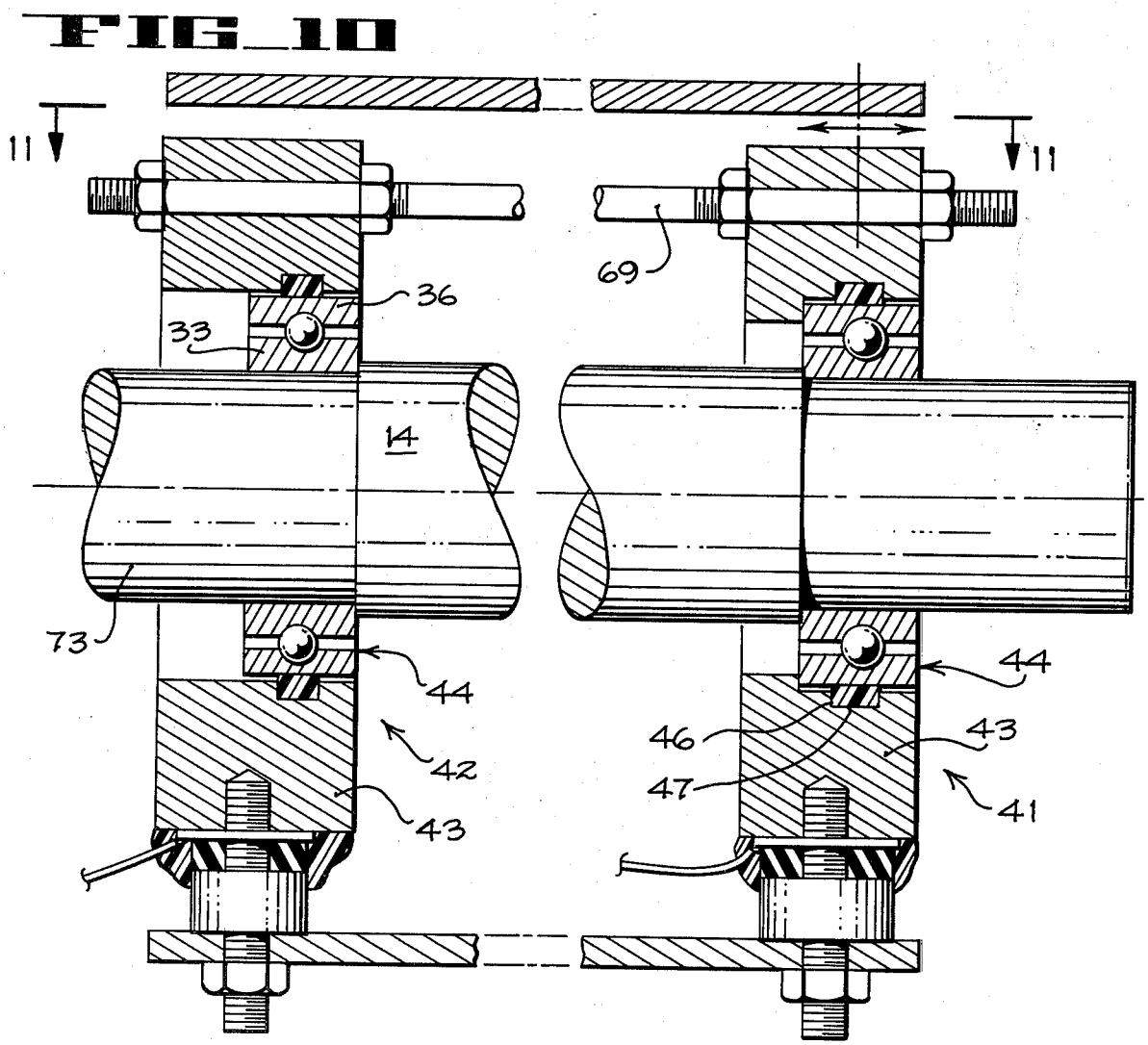

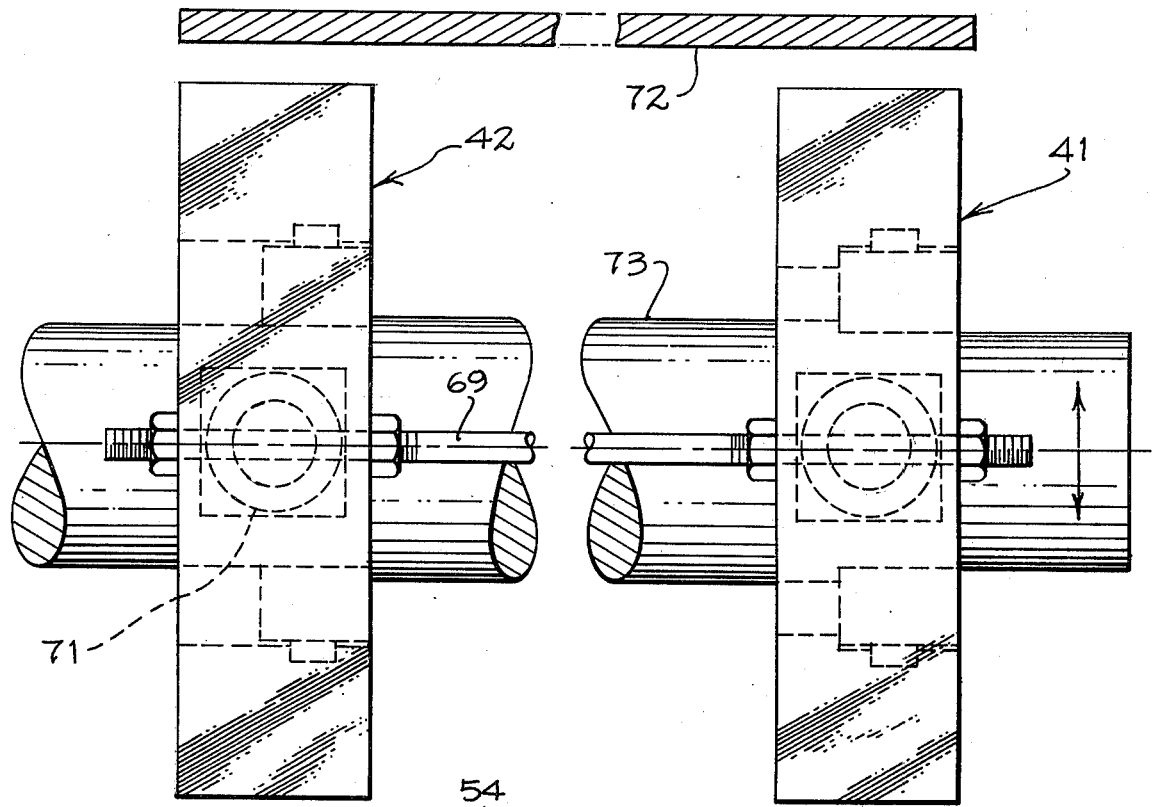
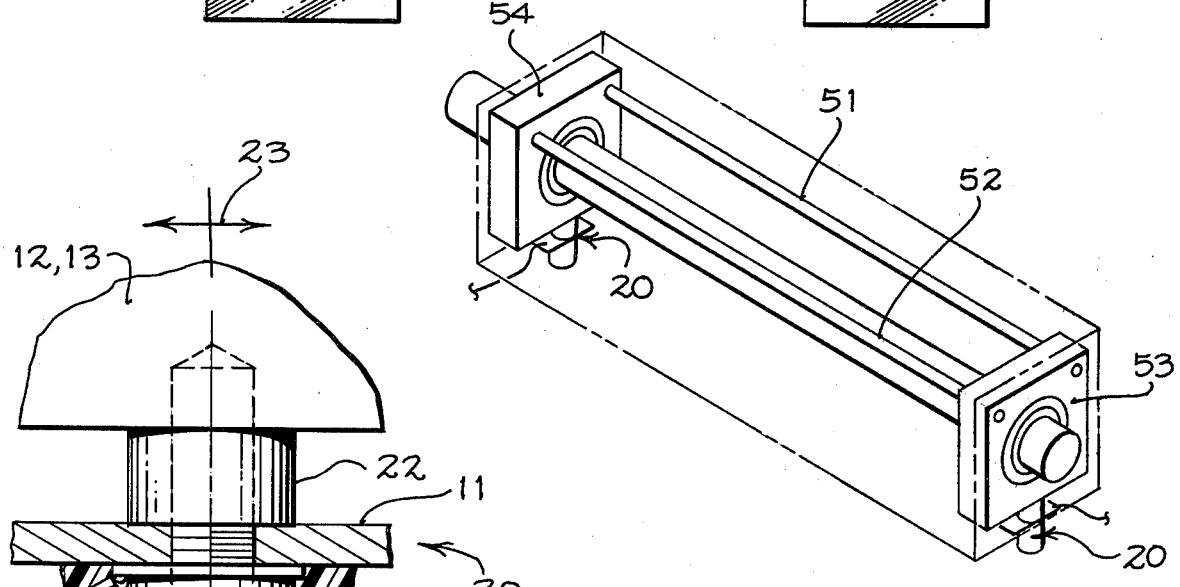

DRIVE SHAFT MOUNTING ASSEMBLY FOR DYNAMIC WHEEL BALANCING MACHINE

This invention pertains to dynamic wheel balancing machines and more particularly to means for minimizing the sensing of spurious signals derived from imperfections in the manufacture of shaft bearings.

In dynamic wheel balancing machines a wheel and tire assembly to be balanced is mounted onto a driven shaft to rotate the assembly. Axially spaced bearings support the shaft for rotation while sensors detect imbalance forces associated with planes defined by the inner and outer rims of the wheel.

It has been observed that run-out in the tracks of a bearing and other imperfections in bearings causes the sensors to receive spurious forces acting sidewise thereon which falsely appear as imbalance forces. In certain force transducers, such as piezoelectric sensors, those spurious forces acting axially of the shaft (as may be caused by bearing run-out) generate a non-linear response so as to be particularly undesirable.

As disclosed herein, means for absorbing forces tranmitted axially between the bearings as may be caused by run-out in the tracks of a bearing or from other imperfections helps to eliminate these spurious or false imbalance signals.

Dynamic wheel balancing equipment is known employing bearings rigidly fixed within a bearing housing for supporting the rotational movement of the drive shaft. An unbalanced wheel carried on one end of the drive shaft and rotated at a sufficient speed causes the housing to move in response to the unbalanced forces acting thereon via the bearings. Where the housing is supported by sensors to detect unbalanced forces, any axial movement of the housing caused by run-out in one of the bearings will necessarily be transmitted directly to the other sensor so as to provide a spurious imbalance indication.

As disclosed herein a drive shaft mounting assembly for a dynamic balancing machine provides means for substantially isolating the sensors from being subjected to such spurious axial forces derived from the bearings themselves. In short, the disclosed assembly serves to substantially limit forces acting upon each bearing block assembly to those forces acting in the balance plane thereof.

In general, a wheel balancing machine of a type for rotating an unbalanced wheel/tire assembly carried on the end of a driven shaft includes generally an elongate bearing housing and a plurality of bearing block assemblies disposed within the housing and spaced axially along and in supporting relation to the shaft. Force sensing means carried by said housing and coupled in force receiving relation to each bearing assembly generate electrical signals proportional to imbalance forces acting thereon. Elongate rod means extending between the bearing block assemblies are rigid enough and arranged to substantially absorb axial forces developed at either of the two bearing block assemblies so as not to act upon the other (and its associated sensor). Accordingly, suitable rod means should be flexible enough to permit radial transfer of force in the balance plane of each bearing block assembly while being rigid enough to absorb axial forces therebetween.

In general it is an object of the present invention to provide an improved wheel balancing machine characterized by improved means for supporting a drive shaft for rotation.

Another object of the invention is to provide a wheel mounting assembly for a dynamic wheel balancer in a manner improved to inhibit transducing of spurious forces so as to provide more accurate sensing of imbalance forces.

Yet another object of the invention is to provide means for preventing axial forces acting on a first sensor from acting upon a second sensor where the sensors are each respectively disposed in the plane of and in supporting relation to an associated one of two bearing assemblies.

An additional object of the invention is to provide a drive shaft mounting assembly having means for inhibiting transmittal of axial movement between sensors associated with the two bearing assemblies.

Yet a further object of the invention is to provide means maintaining a virtually parallel direction for the respective imbalance forces acting against each of two axially spaced bearing block assemblies.

Yet an additional object of the invention is to provide means for absorbing axial forces generated at one or another of a pair of axially spaced bearing block assemblies while supporting the bearings in a somewhat "floating" manner for minimizing any transmission of spurious axial force to the sensors of the system.

The foregoing and other objects of the invention will become more readily evident from the following detailed description of preferred embodiments when considered in conjunction with the drawings.

FIG. 1 shows a diagrammatic perspective view of a drive shaft mounting assembly for use in conjunction with a dynamic wheel balancing machine, according to the invention;

FIG. 2 shows an enlarged elevation view partially in section of a force transducing sensing device;

FIG. 3 shows an enlarged diagrammatic elevation view partially in section of a passive spacer unit;

FIGS. 4, 6, 7, and 9 show diagrammatic perspective views of four different embodiments according to the invention;

FIG. 5 shows a diagrammatic perspective view of a bearing block assembly carried on the ends of two rods, for explanation;

FIG. 8 shows an elevation section view taken along the line 8—8 of FIG. 7;

FIG. 10 shows an enlarged elevation section view taken along the line 10—10 of FIG. 9 showing the bearing assemblies and mounting structure;

FIG. 11 shows a plan view of the bearing structure taken along the line 11—11 of FIG. 10;

FIG. 12 shows a diagrammatic perspective view according to a further embodiment of the invention;

FIG. 13 shows an enlarged elevation view, partially in section of a sensor assembly as shown in the embodiment of FIG. 12; and FIG. 14 shows an enlarged diagrammatic view of the inner race of a mounting bearing having an exaggerated run-out in the track thereof for illustration.

As shown in FIG. 1 a drive shaft mounting assembly 10 includes an elongate hollow bearing housing 11. Housing 11 serves as a support for and contains a pair of bearing block assemblies 12, 13 disposed in spaced relation with respect to the interior of housing 11 by means described further below interposed between housing 11 and each assembly 12, 13. Assemblies 12, 13 support a drive shaft 14 for rotation. One end of shaft 14 carries a drive pulley 16 and drive belt 17 for rotating shaft 14 while a wheel/tire assembly 18 rotates with the opposite end of shaft 14. Conventional means can be employed to attach wheel/tire assembly 18 onto shaft 14 to rotate therewith.

Force sensing means, as now to be described, lie in the plane of a respective one of each of the two bearing assemblies 12, 13. A passive spacer assembly 19 includes a threaded stud 21 extending downwardly from bearing assembly 13 and through a supporting wall of housing 11. Spacer assembly 19 includes a passive spacer body 22 interposed between the bottom of bearing assembly 13 and housing 11. Spacer body 22 includes an elongate rib portion 22a formed with a narrow flat bottom surface disposed substantially on a diameter of spacer body 22 and extending normal to the plane of assembly 13 to permit bearing assembly 13 to rock in the direction of the double ended arrow 23 in response to receiving imbalance forces from rotation of wheel/tire assembly 18.

Similarly, a sensor assembly 24 includes a force transducer such as a piezoelectric element 26 of a type whereby changes in forces acting thereon generate an electric signal on lead 27. Element 26 is preferably disposed between bearing assembly 13 and the upper surface 28a of a spacer 28. The nut 29 carried on the end of stud 31 tightens assembly 24 to housing 11 just as nut 32 carried on stud 21 tightens assembly 13 against spacer assembly 19.

Piezoelectric elements 26 are of a known type which are pressure sensitive. Thus, imbalance forces generated by rotation of an unbalanced wheel/tire assembly 18 cause each of the bearing assemblies 12, 13 to be subjected to forces acting in their own planes. As such, these imbalance forces are detected by elements 26.

FIG. 5 shows a schematic diagram for providing a simplified explanation of the action of forces in the balancing plane of a bearing block assembly 3 supporting an end of a driven shaft 4.

A corresponding bearing block assembly (not shown in FIG. 5) supports the other end of shaft 4. Means, such as an arrangement of rods 7,8 inhibits transfer of axial movement between the assemblies 3 while permitting movement of each assembly 3 in the balancing plane thereof, as represented by the arrows "v" and "h", so as to permit each bearing block assembly to act substantially only upon its associated sensor 6. Thus, rods 7, 8 are flexible enough to permit movement of the bearing block assemblies 3 in their respective balancing planes while being rigid enough to substantially prevent, in the configurations shown, axial transfer of movement therebetween.

Thus, the rods absorb axial forces acting upon them from one end to preclude transmittal of movement axially between assemblies 3. Accordingly, it has been observed that by using rods of the kind described to extend between spaced bearing block assemblies and by securing the assemblies to a common support, a substantially rigid system (in the axial direction) can be provided whereby any axial movement at one bearing will be inhibited from affecting the sensor at the other bearing.

As shown in FIG. 14, and to illustrate the source of axial forces in shaft 14, the inner race 33 of a bearing diagrammatically includes a substantial deviation in the track 34 thereof. This deviation is referred to herein as "run-out" and, assuming that the track of the outer race 36 lies in a plane so as not to include the deviations shown in track 34, it will be readily evident that as shaft 14 rotates with race 33, axial movement will be imparted into shaft 14. Axial movement of the kind described causes the bearing assembly associated with such defective race to rock in a direction normal to the plane of the bearing assembly. This rocking movement, as noted above, provides a non-linear output from piezoelectric sensing element 26 to falsely appear to be part of the signal derived from the unbalanced forces acting on the wheel/tire assembly.

If one of the two bearing assemblies 12, 13 includes a substantial run-out the formation of a force transfer connection axially between the two bearing assemblies can cause the piezoelectric element of the other bearing assembly to provide a similar response to the run-out condition.

Accordingly, means are provided as now to be described for precluding axial forces generated at one of the bearing block assemblies from being transmitted to the other, or to the nearest sensor. In addition, in a preferred embodiment the foregoing means serves to keep the bearing block assemblies, such as 12, 13, moving in parallel planes thereby maintaining a mutually parallel direction to the forces acting against each of the two bearing block assemblies. This parallelism inhibits the sensing of axial forces by a sensor associated with a bearing assembly having substantial run-out.

Thus, as shown in FIG. 1, a plurality of three elongate rods 37, 38, 39 extend between and are secured at their opposite ends to each of bearing block assemblies 12, 13. Rods 37-39 as arranged resist axial movement from one bearing assembly to the other while remaining flexible enough to permit movement of their ends in the balance plane of each assembly 12, 13. Thus, according to one preferred embodiment as shown in FIG. 1, quarter inch steel rods approximately 14 inches long have been arranged as now to be described.

As the wheel/tire assembly 18 rotates, any spurious axial forces will be directed into and along the rods. However, the arrangement and nature of the rods absorbs such axial forces to preclude transmission of axial movement to the other bearing assembly (and its associated sensor).

Means for supporting drive shaft 14 and its associated bearings to ride on a resilient surface serves to inhibit the transmission of axial (or other spurious) forces to the sensing unit associated with such bearing assembly.

Thus, while FIG. 10 represents an elevation section view taken through the embodiment of FIG. 9, the bearing assembly shown therein and as mounted can be used in other embodiments as well.

Each of the two bearing assemblies 41, 42 (FIG. 10) comprises a block 43 and bearing 44 disposed within its associated block. Resilient means in the form an "O" ring 46 lies in an annular groove 47 to be compressed when mounting bearing 44 within block 43. "O" ring 46 serves to absorb remaining spurious axial forces from sources such as the run-out in the inner or outer races of bearing 44.

FIG. 13 shows another embodiment of means for spacing a bearing assembly from housing 11 and for sensing forces acting in the blanace plane of the bearing assembly. While disposition (FIG. 1) of spacer assembly 19 and sensor assembly 24 between an associated bearing assembly 12 may be preferred, a combined spacer and sensor assembly unit 20 as shown in FIG. 13 introduces something of a cantilevered action whereby the output of the sensor will be enhanced significantly.

Thus, as shown in FIG. 13 a passive spacer 22 has been interposed between an edge of a bearing assembly such as 12, 13 described above. A threaded stud 21 extends downwardly through spacer 22 and a wall of housing 11 to carry a pressure responsive sensor element 26 externally of housing 11. Suitable mounting plastic 25 surrounds sensor element 26 while permitting forces to be transmitted in response to movements of a bearing assembly 12, 13 in the plane thereof as shown by arrow 23. Thus, a force sensing means carried by housing 11 has been coupled in force receiving relation to each bearing assembly for generating an electrical signal proportional to the imbalance forces acting thereon while spacing the periphery of the bearing assembly from the interior surfaces of housing 11.

Where three rods 37–39 are employed as disclosed in FIG. 1 imbalance forces acting upon either of the bearing assemblies will act substantially parallel to one another. Thus, a plurality of rods are disposed and arranged to cause the bearing block assemblies to limit application of imbalance forces to sensing means to those forces lying in substantially parallel planes.

Preferably a relatively heavy base 48 supports drive shaft mounting assembly 10 to create a dynamic wheel balancing machine.

Additional embodiments as now to be described have been represented primarily diagrammatically in order to permit a clearer understanding thereof. In view of the description of the foregoing embodiment it is believed unnecessary to mention some of the details in association with each of these embodiments since it is clear that they can be employed as drive shaft mounting assemblies in each instance with the advantages noted above.

FIG. 4 shows a diagram representative of the preferred embodiment described above.

Thus, additional embodiments employ elongate rod means coupled at one end to an associated one of a pair of bearing block assemblies as now to be described, together with means for holding the other end of the rods so as to absorb the transmission of axial forces between bearing block assemblies and thereby prevent axial movement at one bearing from introducing axial movement at the other.

Thus, in FIG. 6 two elongate rods 51, 52 of equal length are coupled between a pair of bearing assemblies 53, 54 of a type corresponding to assemblies 12, 13.

Spacer elements 56 corresponding to passive spacer 22 are disposed in the balance plane of, and beneath each of assemblies 53, 54.

In the embodiment of FIG. 6 sensor elements 61 and spacers 56 support their respective bearing block assemblies 53, 54 in spaced relation within the interior of housing 11 which acts as a support for both.

Another embodiment as shown in FIG. 12 includes a pair of rods 51, 52 extending between a pair of bearing assemblies 53, 54 as above described, to absorb axial forces applied therealong.

As shown in FIG. 12, a combined sensor/spacer assembly 20 of a type shown in FIG. 13 detects imbalance forces acting thereon.

Other embodiments of the invention are shown in FIGS. 7 and 9. In FIG. 7 a pair of rods 62, 63 extend from an associated one of two bearing assemblies 64, 66 and are "grounded" or held at their opposite ends by attachment to a portion of housing 67. As shown in FIG. 7 a rigid block portion 67a depends downwardly from within housing 67 and holds the inner ends of rods 62, 63 whereby each of rods 62, 63 can absorb axial forces applied thereto without transmitting same to the sensor associated with the other bearing assembly.

Sensor elements 68 disposed beneath an associated one of bearing assemblies 64, 66 serves to space the bearing assembly from the interior of housing 67.

As thus arranged the ends of rods 62, 63 which are fastened to bearing block assemblies 64, 66 provide limited support thereto from above in addition to absorbing axial forces between the two assemblies.

Finally, as shown in FIG. 9 an elongate rod 69 extending between a pair of associated bearing block assemblies 41, 42 serves to absorb axial forces therebetween. Sensor elements 71 shown in FIG. 9 disposed within housing 72 respond to the imbalance forces derived from rotating an unbalanced wheel with drive shaft 73. At the same time any axial movement generated by run-out in one of the two bearing assemblies will be isolated from the other bearing assembly by substantially grounding rod 69 at the other end.

From the foregoing it will be readily evident that there has been provided an improved drive shaft mounting assembly for use in conjunction with dynamic wheel balancing machines whereby axial forces at one bearing assembly can be isolated from the other bearing assembly (and its associated sensor). In addition, by maintaining parallelism between the forces acting on each of the two bearing assemblies, any run-out in a given assembly is substantially prevented from being transmitted to its own associated sensor. Further, any small amount of spurious movement which may fail to be removed by means of the rod arrangement can be significantly minimized if not reduced entirely by virtue of the resilient mounting of the bearings with respect to their associated blocks. It will also be clear that generally sensing means have been carried by the housing to be coupled in force receiving relation to an associated one of the assemblies for generating an electrical signal proportional to imbalance forces acting in the balancing plane thereof. In addition elongate rod means have been coupled at one end to an associated one of the bearing block assemblies and held at their other end in a manner to permit flexing in the balancing plane of each bearing assembly to allow radial balancing in the plane of the two bearing assemblies.

What is claimed:

1. In a wheel balancing machine of the type for rotating an unbalanced wheel/tire assembly providing imbalance forces thereof, a driven shaft adapted to carry a wheel/tire assembly to rotate therewith, an elongate bearing housing, a plurality of bearing block assemblies within said housing spaced axially along said shaft and supporting said shaft for rotation, the periphery of each said assembly being spaced from the interior walls of said housing, force sensing means disposed substantially in the plane of each said assembly for generating an electrical signal proportional to imbalance forces acting thereon, and elongate rod means extending between said bearing block assemblies, the last named means being disposed and arranged to absorb axial forces applied thereto.

2. In a wheel balancing machine according to claim 1 in which said rod means comprises a plurality of rods disposed and arranged to cause said bearing block assemblies to limit imbalance forces applied to said sensing means to those acting in substantially parallel planes.

3. In a wheel balancing machine of a type for rotating an balanced wheel/tire assembly providing imbalance forces thereof, a driven shaft adapted to carry a wheel/tire assembly to rotate therewith, means forming a support, a plurality of bearing block assemblies carried by said support in a manner spacing the periphery of said assemblies from said support, said assemblies being spaced axially along said shaft and supporting said shaft for rotation, elongate rod means extending between said bearing block assemblies, the last named means being disposed and arranged to absorb axial forces acting therebetween, and force sensing means interposed between each said assembly and said support for generating an electrical signal proportional to imbalance forces acting in the plane of an associated bearing block assembly.

4. In a wheel balancing machine, according to claim 2, in which said force sensing means associated with each said bearing assembly includes a spacer element and a force transducer element, and means carrying both said elements on a common axis lying substantially in the plane of its associated bearing assembly, said spacer element serving to dispose the periphery of its associated bearing assembly in spaced relation to the interior wall of said housing.

5. In a wheel balancing machine according to claim 3 in which each said bearing block assembly comprises a bearing having inner and outer races, a block supporting said bearing, resilient means interposed between said outer race and said block to inhibit transmittal of sidewise forces from said bearing to said block.

6. In a wheel balancing machine of a type for rotating an unbalanced wheel/tire assembly to provide imbalance forces thereof, a driven shaft adapted to carry a wheel/tire assembly to rotate therewith, a plurality of bearing block assemblies for supporting the shaft for rotation, each said bearing block assembly including a block and a rolling bearing, resilient means interposed between each said bearing and its associated block to inhibit transmittal of axial forces from said bearing to said block, said resilient means being substantially thinner radially than axially and force sensing means disposed substantially in the plane of each said bearing block assembly for generating an electrical signal proportional to imbalance forces acting thereon.

7. In a dynamic wheel balancing machine of a type for rotating an unbalanced wheel/tire assembly for detecting imbalance forces acting thereon comprising a driven shaft adapted to carry a wheel/tire assembly to rotate therewith, means forming a support, a plurality of bearing block assemblies carried by said support and spaced axially along said shaft and supporting said shaft for rotation, means spacing the periphery of said assemblies from said support, elongate rod means extending between said bearing block assemblies, the last named means being rigid enough and arranged to absorb axial forces developed at either of said bearing block assemblies and flexible enough to permit radial transfer of forces in the balance plane of each bearing block assembly, and force sensing means carried by said support and coupled in force receiving relation to each said assembly for generating an electrical signal proportional to imbalance forces acting thereon.

8. In a dynamic wheel balancing machine of a type for rotating an unbalanced wheel/tire assembly for detecting imbalance forces acting thereon comprising a driven shaft adapted to carry a wheel/tire assembly to rotate therewith, an elongate housing, a plurality of bearing block assemblies within said housing spaced axially along said shaft and supporting said shaft for rotation, means spacing said assemblies from the interior surface of said housing, a plurality of elongate rod means each respectively coupled at one end to an associated bearing block assembly, means holding the other end of each said rod means in a manner to absorb axial forces applied thereto while permitting movement of said assemblies in their respective balance planes, and force sensing means carried by said housing and coupled in force receiving relation to each said assembly for generating an electrical signal proportional to imbalance forces acting thereon.

9. In a dynamic wheel balancing machine of a type for rotating an unbalanced wheel/tire assembly for providing imbalance forces acting thereon comprising a driven shaft adapted to carry a wheel/tire assembly from an end thereof and to rotate therewith, an elongate housing, a plurality of bearing block assemblies within said housing spaced axially along said shaft and supporting said shaft for rotation, means spacing said assemblies from the interior wall of said housing including both a sensor element and a spacer element disposed substantially in the plane of each said assembly and along a given side of its associated assembly, a plurality of elongate rod means each respectively coupled at one end to an associated one of said bearing block assemblies, means holding the other end of each said rod means to absorb axial forces applied thereto from its associated bearing block assembly, said rod means permitting radial transfer of forces in the plane of said assemblies, said sensor elements being coupled in force receiving relation to each said assembly for generating an electrical signal proportional to imbalance forces acting thereon.

10. In a dynamic wheel balancing machine according to claim 9 in which said given side of one bearing block assembly is disposed substantially normal to said given side of another bearing block assembly.

11. In a wheel balancing machine of a type for rotating an unbalanced wheel/tire assembly to provide imbalance forces and having means for sensing the imbalance forces thereof, a driven shaft adapted to carry a wheel/tire assembly to rotate therewith, an elongate housing, a plurality of bearing block assemblies within said housing spaced axially along said shaft and supporting said shaft for rotation, each said assembly comprising a block and a rolling bearing, resilient means interposed between each said bearing and its associated block for supporting each said bearing within its associated block in a manner serving to inhibit transmittal of sidewise forces from said bearing to said block, and force sensing means disposed substantially in the plane of each said bearing block assembly for generating an electrical signal proportional to imbalance forces acting thereon.

* * * * *